United States Patent Office 3,343,082
Patented Sept. 19, 1967

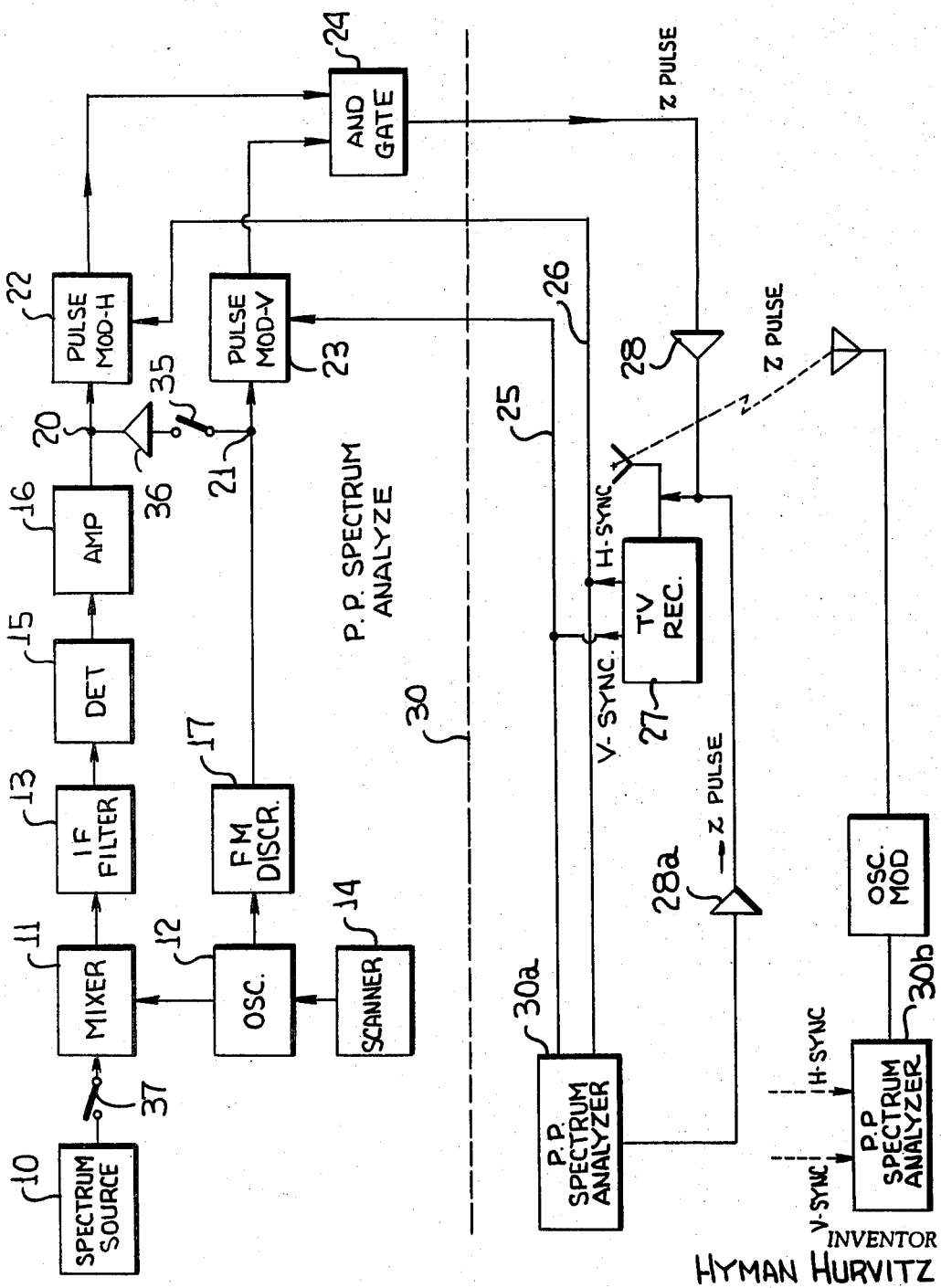

3,343,082
RASTER SCANNING SPECTRUM ANALYZER
Hyman Hurvitz, 326 Woodward Bldg.,
Washington, D.C. 20005
Filed July 27, 1964, Ser. No. 385,334
5 Claims. (Cl. 324—77)

The present invention relates generally to spectrum analyzers, and more particularly to spectrum analyzers employing raster displays.

A considerable part of the cost of a spectrum analyzer relates to its display. Commercial spectrum analyzers, moreover, usually employ 5" oscilloscopic tubes, so that a relatively small plot is provided. This plot cannot be accurately read because of its size. It would be highly advantageous to provide a large display, or to increase the size of the plot, provided this could be done economically. Commercial (NTSC) TV receivers having 23" tubes can be purchased at low cost, and they are almost maintenance free. It would therefore be an advance in the art of spectrum analysis to marry a scanning receiver to a commercial TV receiver. One difficulty is that the raster scan rate (V) of a television receiver is 60 c.p.s. and this is far too fast a scan rate for scanning receivers. Scanning receivers may be operated for audio analysis, for example, and require 2 seconds to several minutes to complete one scan, depending on the fineness of resolution required. In accordance with the present invention, scan frequency and output amplitude of the receiver are both continuously converted to pulse position, one with respect to the V scan period and the other with respect to the H scan period of a TV receiver, the V output pulses coinciding in duration with a complete H scan, and the H pulse being for shorter, specifically of TV dot duration. On V and H pulse coincidence the TV raster, normally blank, is intensified to produce a dot. Normally frequency $F=V$ and amplitude $A=H$, and as F and H vary with time during a frequency scan, a visually continuous curve will be generated on the TV screen.

Because of the nature of the display, very economical "Panadapters" can be provided, on the assumption that the usual user of such devices has a TV receiver for normal TV reception in any event, so that he need only purchase a scanning receiver and pulse time modulators to provide two diverse facilities, i.e. signal intercept and TV reception. The system can be simplified by deriving V and H sync pulses from the TV receiver for use in the scanner pulse position modulator (PPM) which in turn permits the user to watch a TV program, and to superpose thereon a spectrum display, if he desires.

A defect of current spectrum analyzers is that amplitude cannot be accurately read, over the range of amplitudes which may occur, say 1:1000. To obviate this difficulty becomes feasible in using a raster display in that the H or amplitude deflections provide a base line against which a pulse coded response may be displayed. So, for each H scan the amplitude of the receiver may be measured, the measurement converted to PCM (pulse code modulation), of any desired accuracy, and the pulse code caused to turn on the beam of the scope.

A further advantage of the system is the plural spectra can be displayed, whether or not they involve the same frequency bands, and can readily be distinguished by employing Z modulation differences or pulse length differences to distinguish the plots.

The system has the further advantage that a range of spectrum analyzer instruments can be provided, all of which can use the same display device, without regard to differences in frequency bands subject to analysis. In fact, the spectrum information can be developed remotely from the display, and can be coupled to the latter by radiation. In such case, since a TV receiver inherently has tuner facility for plural channels, different instruments can be arranged to transmit over different ones of the channels, if desired.

It is, accordingly, an object of the invention to provide a spectrum analyzer employing a conventional television receiver as its display.

It is another object of the invention to provide a system of spectrum analysis wherein at least one of the components of the spectrum is displayed in coded form, to provide high reading accuracy in a small space.

It is a further object of the invention to provide a system of spectrum analysis in which plural spectra may be simultaneously developed on a single display surface.

It is still another object of the invention to provide a system of spectrum analysis which employs a conventional television receiver, capable of receiving and displaying television pictures, as a display device.

It is a further object of the invention to provide a system of spectrum analysis wherein the output of the system, in frequency and amplitude, is delivered as a single pulse.

A further object of the invention is a spectrum analyzer which delivers a standard NTSC television signal as its output.

The above and still further objects, features and advantages of the present invention will become apparent upon consideration of the following detailed description of one specific embodiment thereof, especially when taken in conjunction with the accompanying drawings, wherein:

The single figure of the drawings is a block diagram of a system according to the invention.

Referring now to the drawings, 10 denotes a source of a band of frequencies, representing a spectrum. The source 10 is connected to a mixer 11, which is also supplied with local oscillator frequency by oscillator 12, a difference frequency being detected by I.F. filter 13. Scanner 14, which may be a reactance tube and a sawtooth voltage, causes the oscillator 12 to scan over a range of frequencies designed to cause successive conversion of the frequencies of the spectrum provided by source 10 to the I.F. frequency. The scan rate and the I.F. bandwith may be selected according to known principles to provide a desired resolution. The output of I.F. filter 13 is detected by detector 15 and the latter output is amplified to a suitable level in amplifier 16. The frequency of oscillator 12 is converted to a proportional voltage by frequency discriminator 17, preferably of the pulse count type.

The system as described to this point provides two time correlated output voltages, representing amplitude of a frequency component of the input spectrum, and the frequency of that component, at points 20, 21 of the circuit diagram. These voltages are continuously varying as scanner 14 operates through a cycle.

The voltages at points 20, 21 are continuously being sampled and the samples converted to pulse positions by modulators 22, 23. Pulse position modulators require sync sources to initiate periodic amplitude to pulse position conversions. The sync pulses are the V and H sync pulses present in every commercial TV receiver, arranged pursuant to NTSC requirements, and can readily be derived from such a receiver. In accordance with the present system, frequency F is converted to pulses repetitive at the V rate, i.e. 60 c.p.s., for an interlaced raster system while amplitude is converted to repetitive pulses at the normal H scan rate. Clearly, the reverse arrangement could be used equally well.

Assuming modulators at 22 and 23, which generate a single pulse in each cycle, the V pulses are selected to have lengths equal to one H period, at least. A large number of H pulses then occur for each V pulse, say 535., and the V pulse can extend over one or two or three of the H pulses, is desired. The H pulse, on the other hand, extends over a small part of one H scan, say 1% or ½%. The outputs of the modulators 22, 23 are applied to an "and" gate 24. The output of the latter is then a short pulse, perhaps 1μs, which coincides in time with an element or two of one or two H scans, during a frame, that H scan or those H scans, being selected as a function of scanning frequency.

The V and H sync pulses are derived on leads 25, 26 from TV receiver 27. The output of "and" gate 24 is applied as a Z pulse to the intensifier grid of its CRT. The CRT is operated with the CRT biased down to provide a dark screen, so that the Z pulse intensifies the beam of the CRT and provides a visible dot on the screen.

For the description to this point, each frame of the TV receiver is accompanied by one Z dot, the vertical dimension of which usually will cover about one or two lines of the latter, and the horizontal dimension of which will be about 1% the H scan, and this dot will, in two coordinate directions, V and H, indicate frequency $v$ amplitude, respectively of a spectrum component. The size of the dot, and/or its intensity, as set by Z amplifier 28, is characteristic of a specific plot, which develops over the entire TV screen as scanner 14 proceeds through its cycle.

The block components above dash line 30, represent then a pulse position spectrum analyzer, i.e. one which transmits single pulses, each representing by virtue of its position with respect to two different repetitive time periods, a pair of quantities, in the present case F and A.

It is clear that additional pulse position spectrum analyzers 30a, 30b, can be connected to TV receiver 27, just as is analyzer 33, without mutual interference. The plots deriving from the several analyzers can be visually distinguished by adjusting the relative gains of amplifiers 28, 28a, . . ., or by adjusting the relative lengths of the output pulses. For example, analyzer 30 may provide H pulse 1μs long and V pulses 2 lines long. Analyzer 31 may provide H pulses 3μs long and V pulses 2 lines long. Another analyzer, if used, may provide H pulses 1μs long but V pulses 3 lines long. And one analyzer may generate weak dots—another high intensity dots. In this way a variety of identification codes for pulses deriving from different scanners may be provided.

As a further feasibility, analyzer 30b may radiate its pulses via a pulse oscillator operating at one of the nine or more channels available in a TV receiver, thus taking advantage of receiver gain, and also rendering it feasible to superpose a spectrum plot on a picture being normally received.

For use by radio amateurs and others in monitoring stations on the air, many advantages accrue. The amateur may position his analyzer as convenient, may watch a TV program, and may occasionally insert spectrum information. Since the amateur normally has a TV receiver, he need only purchase a scanner of the Panadapter type, as an additional item of equipment.

The system is also valuable for telemetering multiple spectrum information in missiles to a ground TV receiver, since only one pulse repeated each 1/60 second is required for each spectrum.

Still further, if pulse modulator 22 or 23, or both, is or are pulse code modulators, the system will remain operative while very precise information is being measured, since the accuracy of display is no longer limited by length in any coordinate direction. The required amplitude to pulse code converter is much more expensive than is an amplitude to single pulse position, but a novel capability accrues, say to measure amplitude and/or frequency, to one part in a thousand, without requiring visual estimations of dot position against a scale. The last recited capability if best exploited by having modulator 23 a pulse position modulator, and 22 a pulse code modulator, and providing facility, i.e. switch 35 and isolating amplifier 36, for feeding frequency information from point 21 to point 20, and a switch 37 for disconnecting spectrum amplitude information at will. The same pulse coder thus provides coded amplitude, or coded frequency information, or both simultaneously. It can be readily arranged to have coded F and A informations occupy different parts of the TV screen by utilizing different time ranges for both, i.e. one might display its code over the first 2" of screen and the other over the next two inches.

While it is simpler to utilize the V and H pulses inherent in a television receiver to synchronize a pulse coder, for use in the present system, this is by no means necessary. This procedure permits an operator to watch TV pictures while monitoring spectra, but where the system is designed solely for spectrum analysis it may be desirable to provide an external TV transmitter, which supplies a carrier and V and H sync pulses to a plurality of spectrum analyzers and to one or more TV receivers. In such manner the display generators, and the spectrum dissectors, may be entirely disconnected and the system becomes usable for telemetry and the like.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a system for displaying a plot of amplitude versus frequencies of a frequency spectrum, a receiver including a scanning local oscillator for generating an amplitude function as a function of frequency of said local oscillator in response to said spectrum, means for converting the frequencies of said local oscillator periodically at one repetition rate into first pulses positioned to represent said frequencies of said spectrum, means for converting the amplitudes of the responses of said receiver periodically at another repetition rate into second pulses positioned to represent said amplitudes, cathode ray tube means for generating a raster having said one repetition rate in one coordinate direction and said another repetition rate in another coordinate direction, said cathode ray tube means including means for generating a raster scanning cathode ray beam and means for intensifying said cathode ray beam only in response to coincidence of said first and second pulses.

2. A system for displaying on a raster a magnitude repetitively variable as a function of time elapse, comprising means for converting time elapse continuously into first periodic pulses positioned as a function of said time elapse, means converting said amplitude continuously into second periodic pulses positioned as a function of said amplitude, means generating a raster composed of first scans in a first coordinate direction at the rate of said first pulses and composed of second scans in a second coordinate direction at the rate of said second pulses, one of said rates being at least $w$ times the other rate, where $w$ is a number greater than 100, said means generating a raster including means providing a cathode ray beam scanning said raster, and means intensifying said cathode ray beam only on coincidence of one of said first pulses with one of said second pulses.

3. A system for converting a pair of associated magnitudes into a position within a raster, wherein said raster is formed in response to repetitive first scans at a rate $m$ in one direction and to second scans at a second rate $n$ in another direction, and wherein said rates are interlocked to form repetitive interlocked frames, the combination comprising means synchronized with each of said first scans to convert one of said magnitudes to first pulses positioned according to said one of said magnitudes within said first scans, means synchronized with each of said second scans to convert the other of said magnitudes to second pulses positioned according to the other of said magnitudes within the other of said scans, and means for generating a plot only in response to coincidence of said first and second pulses.

4. A spectrum analyzer, comprising a television receiver having internally thereof means for generating vertical and horizontal sync signals and a cathode ray rectangular raster comprised of successively vertical displaced equal length horizontal traces together composing a frame, a spectrum source, and means responsive to said spectrum source and to said sync signals for modifying said raster to provide a plot of amplitude versus frequency representative of a spectrum provided by said spectrum source by intensifying said horizontal lines selectively at selected points therealong corresponding with values of said pairs of values of said plot.

5. A spectrum analyzer comprising a television receiver said television receiver including a cathode ray tube and means for generating a rectangular raster on the face of said cathode ray tube, a spectrum source, means for repetitively scanning said spectrum at a relatively slow rate to generate a function of amplitude components of said spectrum versus frequency of said components, means for converting at least one of said amplitude and said frequency to pulse code, and means for forming on the said face a time plot of said pulse code.

References Cited

UNITED STATES PATENTS 3,160,815   12/1964   Ford et al.

OTHER REFERENCES

Journal of the British Institution of Radio Engineers, "The Principles and Practice of Panoramic Display," July–August, 1948, pages 184–185.

RUDOLPH V. ROLINEC, *Primary Examiner.*

WALTER L. CARLSON, *Examiner.*

P. F. WILLE, *Assistant Examiner.*